United States Patent [19]

Rosser et al.

[11] 4,234,715
[45] Nov. 18, 1980

[54] PERFLUOROALKYL POLYTRIAZINES CONTAINING PENDENT IODODIFLUOROMETHYL GROUPS

[76] Inventors: Robert A. Frosch, Administrator of the National Aeronautics and Space Administration, with respect to an invention of Robert W. Rosser, San Jose, Calif.; Theodore Psarras, Gainesville, Fla.

[21] Appl. No.: 37,066

[22] Filed: May 8, 1979

[51] Int. Cl.$^3$ .............................................. C08G 63/44
[52] U.S. Cl. .............................. 528/362; 260/33.8 F; 528/401; 528/422
[58] Field of Search ......................................... 528/362

[56] References Cited

PUBLICATIONS

Fluoropolymers–Wall, High Polymers, vol. XXV (1972), pp. 267–289; 307–315.

*Primary Examiner*—Harold D. Anderson
*Attorney, Agent, or Firm*—Armand McMillan; John R. Manning; Darrell G. Brekke

[57] ABSTRACT

New perfluoroalkyl polytriazines containing pendent iododifluoromethyl groups are prepared by the reaction of perfluoroalkyl dinitriles with ammonia to form poly(imidoylamidines), followed by the cyclization of the imidoylamidine groups with, e.g. various mixtures of a perfluoroacyl fluoride with an ω-iodoperfluoroacyl fluoride. The polytriazines obtained can be cured by heat which causes crosslinking at the iododifluoromethyl groups by elimination of iodine and formation of carbon-to-carbon bonds.

4 Claims, 1 Drawing Figure

THERMOGRAVIMETRIC ANALYSIS OF THE CURED PRODUCT OF EXAMPLE 3.
SAMPLE WEIGHT: 17.25 mg; ATMOSPHERE: $N_2$; HEATING RATE: 10 °C/min.

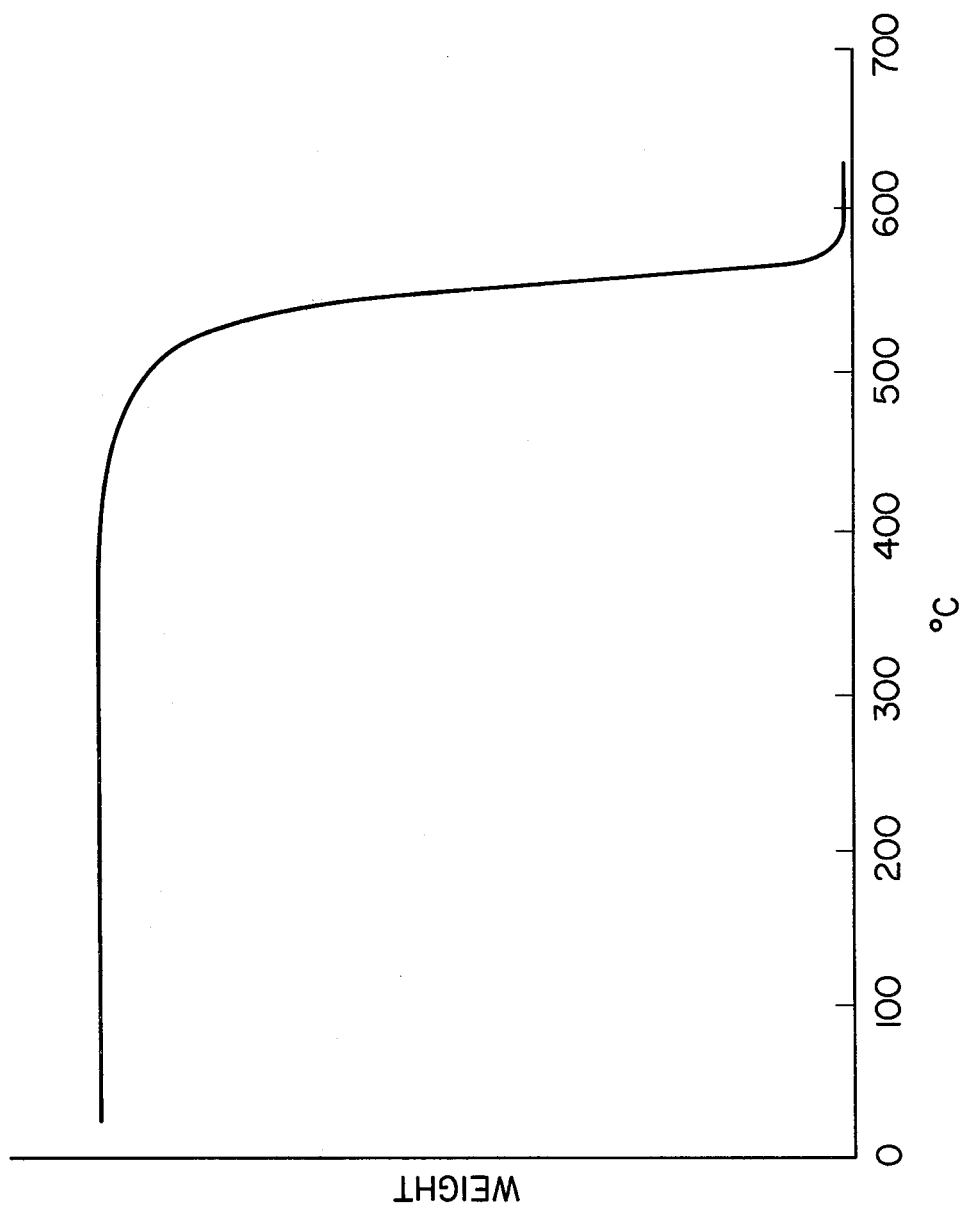

PERFLUOROALKYL POLYTRIAZINES CONTAINING PENDENT IODODIFLUOROMETHYL GROUPS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention relates to perfluoroalkylenetriazine polymers and more particularly to a new method for preparing them.

2. Description of the Prior Art

Perfluoroalkylenetriazine polymers have been prepared heretofore by two different methods, namely the acylationcyclodehydration of imidoylamidines and the free radical coupling of preformed triazine derivatives. However, these polymerization methods have so far yielded polymer specimens that show disappointing material properties [Fluoropolymers, High Polymers Volume XXV, edited by Leo A. Wall, Wyley-Interscience (1972), pages 267 to 289 and 307 to 315; hereafter cited as Fluoropolymers]. In the case of the first and most intensively investigated method, the imidoylamidine approach, it has generally been found to be "very sensitive to reaction conditions, afford poor reproducibility, and yield polymers of molecular weights only marginally high enough for good physical properties". (Fluoropolymers, page 288.) In fact, this approach is said to fail "because the ammonia liberated during cyclization causes reorganization reactions, randomizing the assimilation of mono- and difunctional compounds into triazine rings, altering the functionality of the reaction system, and leading to undesired cross-linking and shortened chains". (Fluoropolymers, page 276.) As to the second method, coupling of preformed triazine rings, synthetic difficulties and poor reactivity have led to polymers that are not elastomeric at room temperature, due to the shortness of the chains between the triazine rings (Fluoropolymers, page 280). In the circumstances, the principal object of the present invention is to provide a method that overcomes some of the shortcomings of the prior art and yields triazine polymers that are elastomeric at ambient temperature.

SUMMARY OF THE INVENTION

It has now been discovered that new linear perfluoroalkyl polytriazines with pendent difluoroiodomethyl groups can be synthesized and thus crosslinked by reaction of the pendent groups under the influence of heat, ultraviolet radiation or conventional metal catalysts.

BRIEF DESCRIPTION OF THE DRAWING

The FIGURE is a plot of the weight loss of a cured polytriazine of the invention against temperature as determined by thermogravimetric analysis.

DETAILED DESCRIPTION OF THE INVENTION

The new linear polytriazines of the invention are prepared by the following reaction sequence:

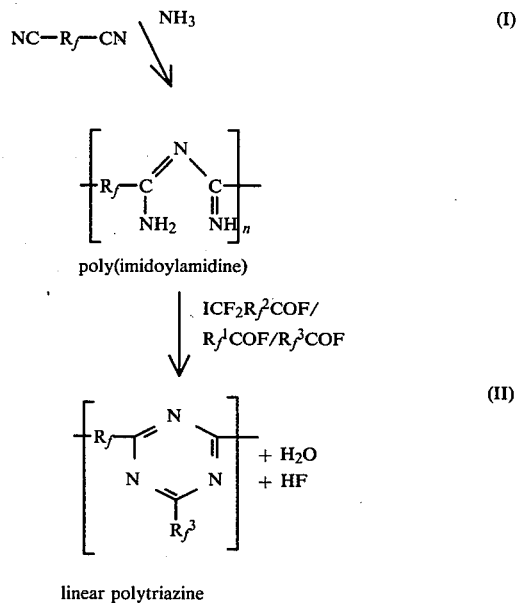

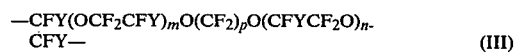

wherein: (a) $R_f$ represents identical bivalent perfluorinated organic radicals or any combination of bivalent perfluorinated organic radicals, said radicals being selected from the group consisting of $-(CF_2)_p-$ in which p ranges from 2 to 18, and oligomeric or polymeric radicals prepared by the reaction of a perfluorinated dicarboxylic acid halide with a perfluoroepoxide and having the formula $$-CFY(OCF_2CFY)_mO(CF_2)_pO(CFYCF_2O)_n-CFY- \quad (III)$$

wherein Y is a fluorine atom or a trifluoromethyl group, p ranges from 2 to 18, and m+n ranges from 2 to 7; (b) $R_f^3$ represents monovalent perfluoro or ω-iodoperfluoro radicals randomly distributed among the triazine units to achieve an overall ω-iodo radical content of about 1 to 100%, preferably 5 to 15%, of said monovalent radicals. Within these limits, the monovalent radicals of the polymers described are selected from the class consisting of: (1) monovalent perfluorinated alkyl radicals ($R_f^1$) containing up to about 11 carbon atoms, (2) ω-iodo-substituted homologs of said perfluorinated alkyl radicals ($ICF_2R_f^2$) (3) monovalent perfluorinated alkylether radicals ($R_f^1$) having the formula $R_f^4O(CFYCF_2O)_yCFY-$, wherein $R_f^4$ is a perfluorinated alkyl group containing up to 3 carbons, Y is fluorine or a trifluoromethyl group, and y ranges from 0 to about 50, (4) ω-iodo-substituted homologs of said monovalent perfluorinated alkylether radicals ($ICF_2R_f^1$), and (5) mixtures thereof.

The ring-closing agents usable in the above reaction are the acyl fluorides, the acyl chlorides, and the anhydrides of (1) the perfluorinated aliphatic acids containing up to about 12 carbons, (2) the oligomeric and polymeric acids of the formula $R_f^4O(CFYCF_2O)_yCFYCOOH$, wherein $R_f^4$ is a perfluorinated alkyl group containing up to three carbons, Y is fluorine or a trifluoromethyl group, and y ranges from 0 to about 50, and (3) the ω-iodo-substituted homologs of the acids of (1) and (2), just described. The proportions of cyclizing agent to poly(imidoylamidine) are essentially stoichiometric, although an excess of the cyclizing agent may be employed is desired. Sodium fluoride may be used to remove the hydrogen fluoride formed in the reaction.

The linear polytriazine materials of the invention can be crosslinked by reaction of their difluoroiodomethyl groups under the influence of heat, ultraviolet radiation, or conventional metal catalysts such as mercury, zinc, and the like. When heat curing is employed, it should be carried at a temperature within the range of 100° to 220° C. for a period of 4 hours to 4 days depending on the degree of cure and the final properties desired.

The preparation of the polymers of the invention will now be illustrated by the following examples which are not intended to limit the scope of the invention. In these examples, all proportions and percentages are on a weight basis unless otherwise specified.

Several linear polytriazines containing various proportions of pendent difluoroiodomethyl groups were made starting with dinitriles of the formula

wherein $m+n$ was equal to 2, 4, 6, and 7, as indicated.

The ring-closing reactant employed were $C_3F_7.O.CFCF_3.COF$ ($R_f{}^1COF$) and, for pendent iodine-containing groups, $ICF_2.CF_2.O(CF_2)_5O.CFCF_3.COF$ ($R_f{}^2COF$). In the table, the fractions of side chains containing iodine in the preparations illustrated, i.e. $R_f{}^2COF/(R_f{}^2COF+R_f{}^1COF)$ ranges from 0.8 to 0.15, said fractions having been achieved by the appropriate molar mixture of ring-closing reactant.

EXAMPLE 1

The general procedure employed to prepare the linear polytriazines of the invention can be described as follows:

The dinitrile, in this case 5.1 g or 3.03 mmoles of a compound in which $m+n=7$, was placed into a 3-neck flask. Anhydrous ammonia was purged into the flask for 2 hours to produce a compound with imidoylamidine infrared peaks at 6.09 μm, 6.28 μm, and 6.12 μm. Nitrile was also shown at 4.43 μm. The poly(imidoylamidine) was dissolved in 30 ml Freon 113, 1,1,2-trichlorotrifluoroethane. All glassware was wrapped with aluminum foil. The ring-closing reactant, 3.1 g or 4.73 mmoles of $ICF_2CF_2O(CF_2)_5OCFCF_3COF$, was added dropwise from a funnel over a period of 2 hours. After completion of the addition, the mixture was stirred overnight. Infrared measurements showed a strong triazine peak at 6.45 μm. The Freon was distilled off at 45° C. A sample of the material was then placed in an oil bath under continuous evacuation conditions. Upon heating slowly from 30° to 90° C., increasing crosslinking occurred as evidenced by increasing modulus. The final substance was pinkish brown and again showed a strong IR triazine peak at 6.45 μm. In the other preparations listed in the table, both an iodine-containing cyclizing agent and an iodine-free cyclizing agents were used in the proportions indicated.

EXAMPLE 2

The polytriazines of the invention can also be prepared from mixtures of iodo-containing and iodine-free acyl fluoride, as follows:

A mixture of $C_3F_7OCF(CF_3)COF$, 10.16 g (30.6 mmoles), and $ICF_2CF_2O(CF_2)_5OCF(CF_3)COF$, 3.5 g (5.4 mmoles), was added slowly to a Freon E4 solution, 50 ml, of 30 molar equivalents of the polyimidoylamidine of a dinitrile (IV) in which $m+n$ is equal to 6 and 2 g of dry sodium fluoride. After stirring the mixture overnight at ambient temperature, hexafluoropropylene dimer acyl fluoride, 10 g, was added to complete the reaction and the mixture was stirred for several hours. The reaction mixture was washed repeatedly with water to remove the acids formed. The organic layer was separated, dissolved in 1,1,2-trichlorotrifluoroethane and passed over a column of neutral alumina to remove any traces of acid. The solvent was removed under vacuum leaving 32 grams of the polytriazine.

EXAMPLES 3 TO 8

A series of triazine fluoroether polymers were prepared with $m+n$ values of 2 to 6 and an iodo-containing side chain fraction $[R_f{}^2COF/(R_f{}^2COF+R_f{}^1COF)]$ of 0.05 to 0.15. The procedure employed was essentially that already described in Example 2, and the preparation characteristics of each polymer as well as some of its properties are summarized in the table below. The linear polytriazines were cured by heating at 160° C. for 4 days, followed by heating at 215° C. in a glass vial for 20 to 100 hours. Modulus was measured on a du Pont 943 thermomechanical analyzer and thermal data was obtained from a du Pont 990 thermal analyzer.

| | | SUMMARY OF POLYTRIAZINE CURING AND CHARACTERIZATION | | |
|---|---|---|---|---|
| Example | m + n | I-Chain Fraction | Tg | Cure at 215° C. | Approx. Modulus (dynes/cm²) |
| 3 | 2 | 0.08 | −35° C. | ~40 hr | 8 × 10⁵ |
| 4 | 2 | 0.05 | −37 | ~40 | 3 × 10⁶ |
| 5 | 2 | 0.12 | −37 | ~20 | 8 × 10⁶ |
| 6 | 4 | 0.05 | −41 | ~60 | 4 × 10⁶ |
| 7 | 4 | 0.08 | −41 | ~20 | 5 × 10⁶ |
| 8 | 6 | 0.15 | −45 | ~100 | 3 × 10⁶ |

The thermal stability of a typical crosslinked polytriazine elastomer (Example 4) is shown in the accompanying FIGURE. Before extraction, the thermogravimetric analysis showed a 1% weight loss at 350° C. and after extraction, the 1% weight loss shifted to 420° C. The potential thermal stability of the poly(triazine fluoroether) elastomer is indicated by the excellent thermogram for the extracted sample. The same material, when tested for isothermal weight loss, showed the following results.

| Temperature | % Weight Loss/Hr |
|---|---|
| 375° C. | 0.8% |
| 400° C. | 4 |
| 425° C. | 8 |

The ω-iodoperfluoroacyl fluorides were prepared in the following manner, starting from the appropriate hexafluoroalkylene oxide-oligomer acyl fluoride.

Diglyme, 65 ml, sodium carbonate, 16 g (0.15 mole), and iodine, 15 g (0.06 mole), were added to a three-necked flask equipped with magnetic stirrer, thermometer, condenser, and dropping funnel. Hexafluoropropylene oxide-pentamer acyl fluoride, 23.8 g (0.03 mole), was added slowly through the dropping funnel to the stirred slurry. After completion of the addition, the mixture was heated to 140°–160° C. for one hour. After cooling to room temperature, the reaction mixture was poured into iced water and the product, 20.5 g, separated as the heavy phase. This product was a mixture of $C_3F_7O[CF(CF_3)CF_2O]_3CFICF_3$ (66.8%) and a second component (32.4%), shown to be by NMR and IR spectra a mixture of the vinylether and the hydroether. Distillation of the product mixture yielded the pure alkyl iodide (boiling point 60° C./0.3 mm). The IR and NMR spectra, as well as the carbon and fluorine contents, were consistent with the alkyl iodide structure given above.

The crosslinked polymers prepared by the method of this invention are tough, elastic, heat and chemical resistant substances which can be used in many demanding applications such as fuel tank sealants, O-rings, wire enamels, pneumatic ducts and edge close-outs in aircraft, and so on. Other uses for the products, as well as variations in the materials and procedures disclosed, can be devised by the man skilled in the art without departing from the spirit of the invention as described by the following claims.

What is claimed is:

1. A linear polytriazine curable to a crosslinked elastomer and consisting of randomly distributed repeating units of the formula

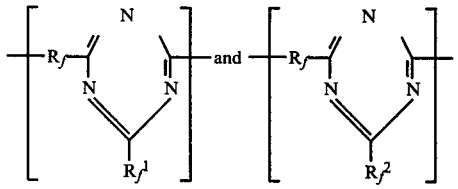

wherein:

(a) $R_f$ represents identical bivalent perfluorinated organic radicals or any combination of bivalent perfluorinated organic radicals, said radicals being selected from the group consisting of $—(CF_2)_p—$ in which p ranges from 2 to 18, and oligomeric or polymeric radicals prepared by the reaction of a perfluorinated dicarboxylic acid halide with a perfluoroepoxide and having the formula

wherein Y is a fluorine atom or a trifluoromethyl group, p ranges from 2 to 18, and m+n ranges from 2 to 7;

(b) $R_f^1$ represents a monovalent perfluoro radical selected from the group consisting of (1) monovalent perfluorinated alkyl radicals containing up to 11 carbon atoms, (2) monovalent perfluorinated alkylether radicals having the formula $R_f^AO(CFYCF_2)_yCFY—$ in which $R_f^A$ is a perfluorinated alkyl group containing up to 3 carbon atoms, Y is a fluorine atom or a trifluoromethyl group, and y ranges from 0 to 50, and (3) mixtures thereof;

(c) $R_f^2$ is a monovalent ω-iodoperfluoro radical selected from the ω-iodo substituted homologs of $R_f^1$; and (d) the number of iodine-containing randomly distributed triazine repeating units constitutes from about 1 to 100% of all repeating units in the linear polytriazine compound.

2. The polytriazine of claim 1 wherein p ranges from 2 to 10, and y ranges from 0 to 15.

3. The polytriazine of claim 1 wherein the proportion of ω-iodoperfluororadicals to iodine-free perfluororadicals ranges from about 5:95 to 15:85.

4. The polytriazine of claim 1 wherein the number of iodine-containing randomly distributed repeating units constitutes from about 5 to 15% of all repeating units in the linear polytriazine compound.